Sept. 3, 1957          G. BEGIN          2,804,783
PEDAL EXTENSION
Filed Aug. 2, 1954          2 Sheets-Sheet 2
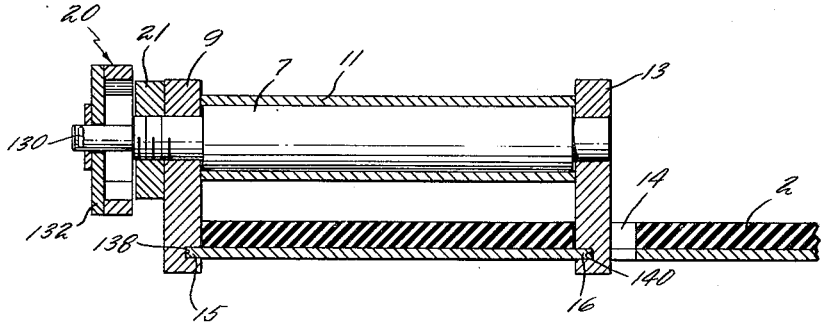
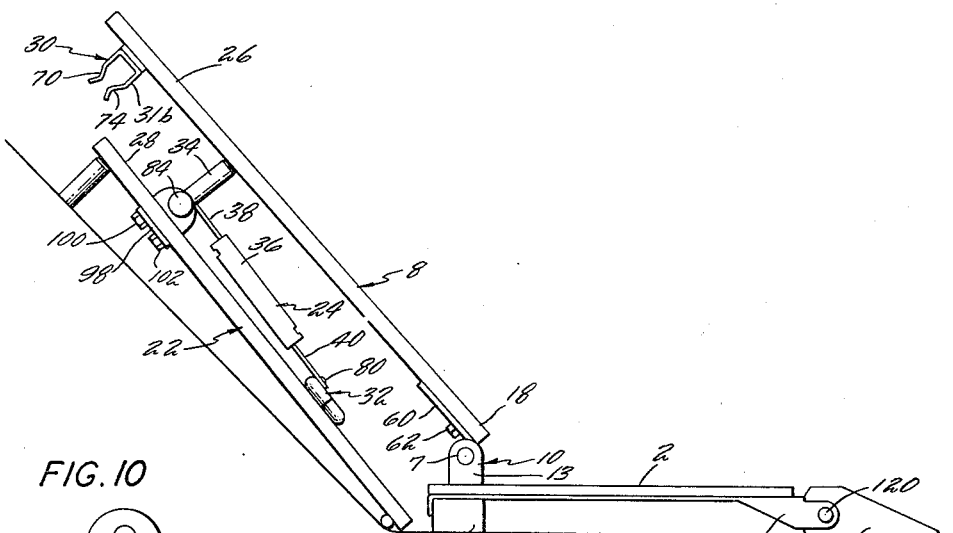
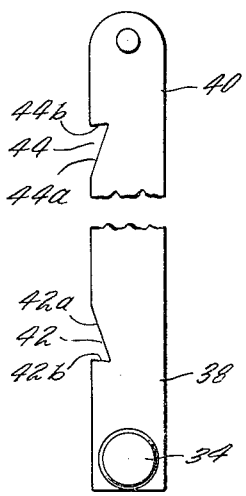
INVENTOR
GREGORY BEGIN
BY Vernon F. Hauschild
ATTORNEY

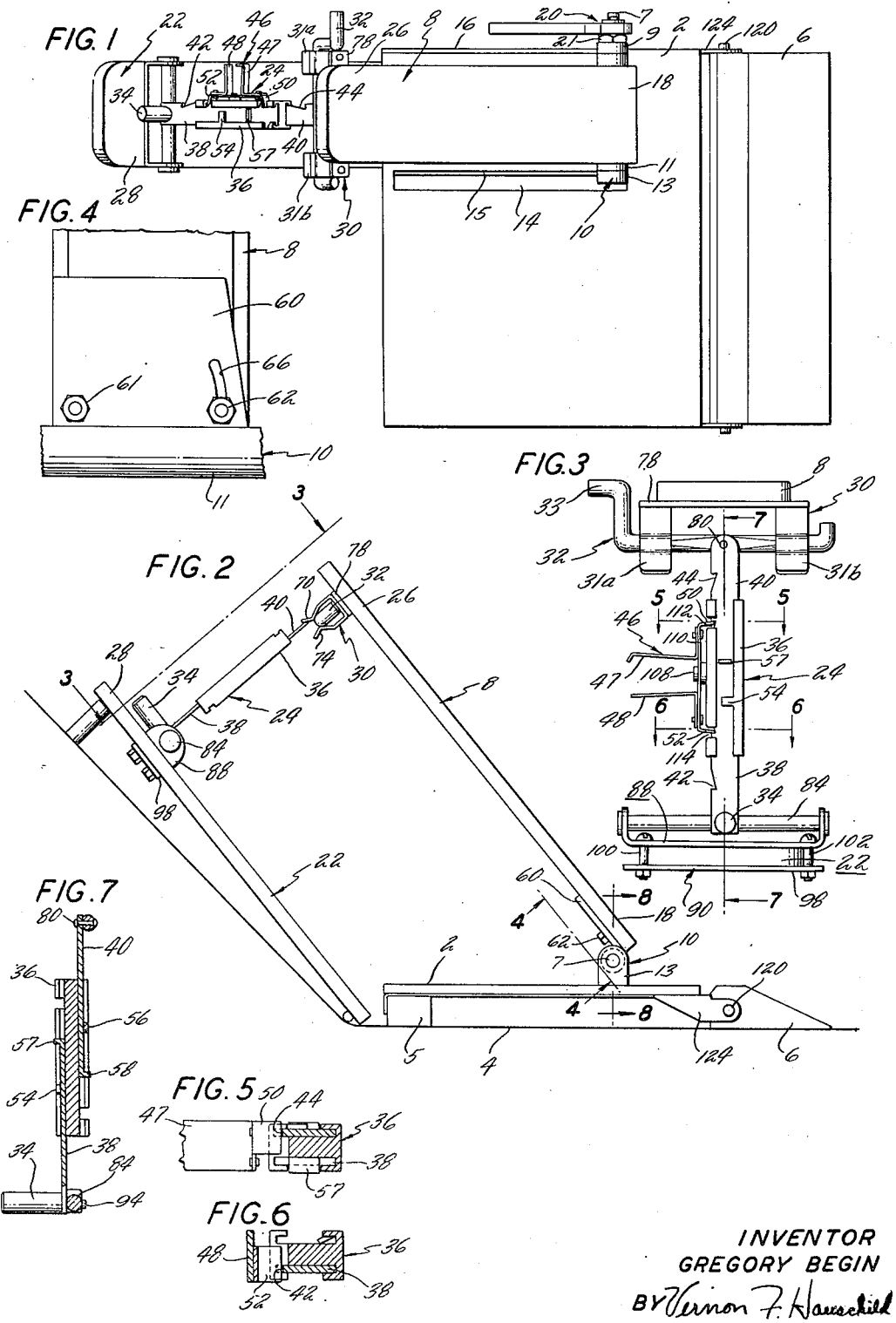

United States Patent Office

2,804,783
Patented Sept. 3, 1957

2,804,783

PEDAL EXTENSION

Gregory Begin, Hartford, Conn.

Application August 2, 1954, Serial No. 447,366

7 Claims. (Cl. 74—562)

This invention relates to depressible pedals and more particularly to an auxiliary pedal to be used in conjunction with a regularly installed pedal for use in situations where the operator has difficulty reaching the regular pedal.

While, for the purpose of simplifying the description, applicant will describe an extension unit for an automobile accelerator foot pedal, it should be understood that the invention is not necessarily so limited and that there are several other uses for such a unit.

Accelerator pedals used in vehicles today normally consist of a flat footrest type of pedal pivotally hinged at its heel or base end to the vehicle floor. This pedal is depressible about its hinged or base end and the degree of depression controls the speed of the vehicle. Several persons find it difficult when operating a vehicle to conveniently contact the accelerator pedal with their foot and must assume awkward positions to depress the pedal. Assuming awkward positions for periods of time results in physical fatigue to the operator. Several other persons are capable of reaching the foot pedal when operating the vehicle but they find the angle of elevation of the pedal or the lateral pedal angle relative to the fore and aft centerline of the vehicle to be such that they become fatigued when depressing the pedal at these angles for long periods of time.

This need for angular variation of the accelerator pedal as well as the movement of the pedal closer to the operator is particularly pronounced in vehicles which are driven by several persons who vary in physical size. The differences in shoe styles which exist between women's wear and men's wear further add to this need for flexibility.

It is an object of the present invention to provide an extension pedal unit for use with a foot pedal in which both the angle of elevation, the lateral angle of the pedal and the operator-to-pedal distance can be varied to suit the desires of the operator.

It is a further object of the present invention to provide an extension pedal unit which is so constructed that the angle of elevation of the extension pedal may be maintained constant as the driver-to-pedal distance is caused to vary.

It is a further object of the present invention to provide an extension pedal unit which may be easily installed for use with a regular pedal in a vehicle without need for attaching parts.

It is a further object of the present invention to provide an extension pedal unit which has a linkage unit to space the auxiliary and regular pedals apart, which linkage is easily expandible manually but which cannot be diminished in length unless certain steps are taken by the operator.

It is a further object of the present invention to provide an extension pedal unit which may be easily made inoperative while still installed.

Other objects and advantages will become apparent from the consideration of the following description in conjunction with the accompanying drawings, in which:

Fig. 1 is a top plan view of the extension pedal which is the subject matter of this application installed in engagement with a regular foot pedal of a vehicle.

Fig. 2 is a side elevation of this extension pedal so installed.

Fig. 3 is a view of the extension pedal unit taken along line 3—3 of Fig. 2 to show the extension linkage unit connecting the extension pedal to a regular foot pedal.

Fig. 4 is a view taken along line 4—4 of Fig. 2 to show the attachment means used to attach the auxiliary or extension pedal to its pivotal heel support.

Fig. 5 is a sectional view taken along line 5—5 of Fig. 3.

Fig. 6 is a sectional view taken along line 6—6 of Fig. 3.

Fig. 7 is a sectional view taken along line 7—7 of Fig. 3.

Fig. 8 is a sectional view taken along line 8—8 of Fig. 2.

Fig. 9 is a side elevation of the extension pedal unit installed in a vehicle but with the extension pedal inoperative or depressed.

Fig. 10 is an enlarged fragmentary view of portions of the extension linkage unit shown in Fig. 3.

As best shown in Figs. 1 and 2, applicant's extension or auxiliary pedal unit consists of a support platform 2 which can be easily installed upon the floor of a vehicle by means of glue or other suitable attachment means between vehicle floor 4 and support blocks 5 and 6. Extension pedal 8, which consists of toe rest portion 26 and base section 18, is pivotally attached to support platform 2 through attachment linkage or unit 10. Extension pedal 8 pivots about pin 7 which is carried within tube 11 of attachment unit 10 and is movable fore and aft in support platform 2. Block 5 is integrally attached to platform 2 and block 6 is pivotally attached to platform 2 through pin 120 which is loosely and pivotally attached to plate 124, which engages platform 2. Longitudinal slot 14 has a track 15 extending its length while track 16 extends along platform 2. Tracks 15 and 16 form a track unit and are engaged by grooves 138 and 140, guides 9 and 13 of attachment unit 10, as best shown in Fig. 8. The base end 18 of extension pedal 8 may be easily locked in the selected position in slot 14 and on platform 2 by means of wrench or clamping means 20. Referring to Fig. 8, we see that wrench 20 is shaped to fit nut 21 and turn nut 21 on threaded pin 7 to clamp grooved guides 9 and 13 on tracks 15 and 16 as the upper portion of guides 9 and 13 bear against tube 11. Attachment unit 10 is so constructed that the length of pin 7 and the height of wrench 20 and nut 21 permit wrench 20 to be lifted clear of nut 21 so that the vehicle operator may use wrench 20 to both loosen and tighten nut 21 to loosen or tighten unit 10 on tracks 15 and 16. A cotter pin 130 and washer 132 or other means are placed at the outer extremity of pin 7 to prevent wrench 20 from becoming detached from unit 10.

Extension pedal 8 is elevated from regular pedal 22 by means of extension linkage unit 24 which is pivotally attached in two directions to both the extension pedal tip or toe rest portion 26 and the regular pedal tip or toe rest portion 28. The expansion of extension linkage unit 24 governs the angle of elevation of extension or auxiliary pedal 8 for any given position of base 18 of pedal 8 in support platform 2. Extension linkage unit 24 is attached to the underside of the toe end of extension pedal 8 by clip means 30 and may be easily detached therefrom by means of release wrench 32. As best shown in Fig. 3, wrench 32 passes through clamps 31a and 31b of clamp unit 30 and projects therebeyond in the form of crank attachment or handle 33. Release wrench 32 is securely clamped to auxiliary pedal 8 during normal operation but may be forcibly released therefrom by the operator who may grip handle 33 and depress same to release wrench 32 from clamp unit 30. This may be done when the operator does not desire to use the extension pedal. With extension linkage unit 24 disconnected from extension pedal 8, the linkage unit 24 may be released to lie flat against the upper central surface of regular pedal 22, whereupon extension pedal 8 will reduce in elevation until it rests upon protector lug 34. Protector lug 34 prevents the weight of extension pedal 8 and the force exerted by the operator thereon from damaging extension linkage unit 24. Figure 9 shows the auxiliary pedal 8 in its depressed or non-operative position. Extension pedal 8 has been lowered onto regular pedal 22.

Clamp unit 30, while not necessarily so limited, may be made of sheet metal and formed into two sets of converging fingers, 70 and 74, as shown in Fig. 2, to form clamps 31a and 31b. The clamps 31a and 31b may be attached to plate 78, by any conventional means, such as welding, soldering or a nut and bolt attachment while plate 78 is attached in similar fashion to the underside of toe portion 26 of auxiliary pedal 8. Converging fingers 70 and 74 are so shaped that wrench 32 is rotatably retained therebetween during normal operation.

Extension unit 24 consists of ferrule 36 which is shaped in the form of a double C-shaped channel back-to-back as best shown in Figs. 5 and 6. Extension rods 38 and 40 project from ferrule 36, each being carried in one of the two C-shaped channels. A plurality of notches 42 are placed in rod 38 while a plurality of notches 44 are placed in rod 40. These notches, 42 and 44, in rods 38 and 40, respectively, consist of angular surfaces 42a and 44a and surfaces 42b and 44b which are perpendicular to the axis of rods 38 and 40 (see Fig. 10) and are engaged by spring tips 50 and 52 of lock unit 46 to prevent extension linkage unit 24 from diminishing in length during vehicle operation. This resistance to length diminishment is caused by spring tips 50 and 52 contacting and bearing against surfaces 42b and 44b of rods 38 and 40. It will be noted that, as shown in Fig. 10, that angular surfaces 42a and 44a of notches 42 and 44 are slanted in opposite directions so that the operator may grasp extension pedal 8 and easily cause extension unit 24 to increase in length so as to increase the angle of elevation of extension pedal 8. As the operator gently pulls pedal 8 upwardly, spring tips 50 and 52 are pressed outwardly from the axis of rods 38 and 40 as they bear against and move along angular surfaces 42a and 44a of notches 42 and 44 until they are free of the notches. As the operator continues to pull upwardly on pedal 8, spring tips 50 and 52 will successively engage each succeeding notch 42 and 44 until the pedal 8 is at the height desired by the operator.

When the operator wishes to reduce the length of extension unit 24, finger prongs 47 and 48 of lock unit 46 must be pinched together to cause spring tips 50 and 52 to disengage notches 42 and 44. With tips 50 and 52 so disengaged, pedal 8 may be depressed to the desired height and angle whereupon prongs 47 and 48 may be released to permit tips 50 and 52 to engage the proper notches 42 and 44 for this position. As best shown in Fig. 3, lock unit 46 is attached to ferrule 36 by pin or rivet 108. As prongs 47 and 48 are pinched together, each end of plate 110 bends away from ferrule 36 to lift spring tips 50 and 52 from notches 42 and 44 of rods 38 and 40 which are aligned with notches 112 and 114 of ferrule 36.

As best shown in Fig. 7, lugs 54 and 56 are provided on ferrule 36 to prevent rods 38 and 40 from pulling out of ferrule 36 during operation. Projections 57 and 58 on rods or arms 38 and 40 respectively, engage lugs 54 and 56 to prevent rod removal.

Linkage unit 24 is pivotally attached in two directions to both auxiliary pedal 8 and regular pedal 22. As shown in Fig. 3, rod 40 of unit 24 is pivotally attached to wrench 32 by means of pin 80. As explained previously, wrench 32 is rotatable within clamp unit 30 so that linkage unit 24 is pivotally attached in two directions to pedal 8. Now considering rod 38 of unit 24, we see in Fig. 3 that it attaches to pivotable rod 84 which is pivotally held in plate 88 of clamp unit 90. Referring to Fig. 7, we see that rod 38 is pivotally attached to rod 84 by loose fitting pin 94 to give unit 24 a two direction pivotal attachment to pedal 22.

Plate 98 and bolt and nut units 100 and 102 clamp pedal 22 to plate 88.

As best shown in Fig. 4, extension pedal 8 is attached to attachment unit 10 by means of plate 60 and nut and bolt units 61 and 62. It will be noted that plate 60 is provided with arcuate slot 66 to receive nut and bolt units 62. Arcuate slot 66 permits installation of auxiliary pedal 8 at any lateral angle desired by the operator. With nut and bolt units 61 and 62 loose, extension pedal 8 may be pivoted laterally with respect to plate 60 and platform 2 and when the desired lateral angle for pedal 8 is reached, the tightening of nut and bolt unit 61 and 62 will hold pedal 8 in this selected position of lateral angle.

It is readily apparent that with extension pedal 8 installed as described above, the movement of pedal 8 by the operator serves to move regular pedal 22. It is also apparent that for any given position of heel rest portion 18 of pedal 8 in support platform 2, the angle of elevation of pedal 8 may be varied infinitely by selecting the proper length of extension linkage unit 24. It is also apparent that for any given length of linkage 24, the angle of elevation of extension pedal 8 may be varied by repositioning base 18 of pedal 8. More important, it is apparent that by varying the position of base 18 of pedal 8 in support platform 2 and also by varying the length of extension linkage unit 24, both the angle of elevation and the pedal-to-driver distance may be varied as desired. Further, for a given angle of elevation of pedal 8, proper positioning of base 18 and length selection of unit 24 can provide the desired change in pedal-to-driver distance.

Although only one embodiment of this invention has been illustrated and described herein, it will be apparent that various changes and modifications may be made in the construction and arrangement of the various parts without departing from the scope of this novel concept.

I claim:

1. An extension foot pedal unit adapted to be attached to a regular pedal such as an automobile accelerator pedal comprising an extension foot pedal having a toe end and a base end, a support platform to which the base end of said pedal is slideably and pivotally attached, an expandable extension linkage adapted to attach said toe end of said extension pedal to the regular pedal in elevated relation thereto and such that said extension pedal may assume several angular positions relative to said regular pedal, means for quickly disconnecting said extension pedal from said extension linkage to permit said extension pedal to be lowered onto the regular pedal, and means attached to said linkage to protect said linkage when the extension pedal is so lowered.

2. An extension foot pedal unit adapted to be attached to a regular foot pedal such as an automobile accelerator pedal comprising an extension foot pedal having a toe end and a base end, a support platform to which the base end of said pedal is slideably and pivotally attached and an expandable extension linkage comprising a first notched arm adapted to be pivotally attached to the regular foot pedal, a second notched arm pivotally attached to said toe end of said extension foot pedal together with a double channeled ferrule joining said first and said second arm.

3. An extension foot pedal unit adapted to be attached to a regular foot pedal such as an automobile accelerator pedal comprising an extension foot pedal having a toe end and a base end, a support platform to which the base end of said pedal is slideably and pivotally attached and an expandable extension linkage comprising a first notched arm adapted to be pivotally attached to the regular foot pedal, a second notched arm pivotally attached to said tip end of said extension foot pedal together with a double channelled ferrule joining said first and said second arm, and means attached to said ferrule to retain said arms in said ferrule.

4. An extension foot pedal unit adapted to be attached to a regular pedal such as an automobile accelerator pedal comprising an extension foot pedal having a toe end and a base end, a support platform having an elongated slot therein to which the base end of said pedal is slideably and pivotally attached, means for quickly locking the base end of said pedal in any selected position in said slot, and an expandable extension linkage adapted to attach said toe end of said extension foot pedal to the regular pedal such that said toe end of said extension pedal is elevated from said regular pedal.

5. An extension pedal adapted to be attached to a regular pedal such as an automobile accelerator pedal comprising an extension foot pedal having a toe end and a base end, a support platform adapted to be secured to a floor and having longitudinal tracks attached thereon to which said base end of said extension pedal is slideably and pivotally attached, means to lock the base end of said extension pedal in any selected position on said tracks, expansion linkage pivotally attached to said toe end of said extension pedal and adapted to be pivotally secured to the regular pedal, and means attached to said platform to vary the lateral angle of said extension foot pedal.

6. An extension pedal unit adapted to be attached to a regular foot pedal comprising an auxiliary pedal having a toe and base section, a support platform having longitudinal tracks, means to pivotally and slideably attach said base section of said auxiliary pedal to said platform, means to lock said base section of said auxiliary pedal in any preselected position on said platform, means attached to said auxiliary pedal to permit the varying of the lateral pedal angle with respect to said platform, clip means attached to the underside of said auxiliary pedal at its toe section, an extension unit comprising a ferrule shaped in the form of C-shaped channels back-to-back, a first notched extension rod projecting from one of said channels, a release mechanism pivotally attached to the free end of said first rod, said release mechanism being rotatably retained within said clip means such that said extension unit is pivotally attached in two directions to said auxiliary pedal, a second notched extension rod projecting from the second of said channels in a direction opposite to said first rod, a clamp unit adapted to be attached to a regular foot pedal and having a loose fitting pin projecting therethrough to which the free end of said second rod is pivotally attached such that said extension unit may be pivotally attached in two directions to a regular foot pedal, means attached to said ferrule to prevent said rods from being pulled out of said ferrule, a lock unit attached to said ferrule which engages said notches of said extension rods to prevent said extension unit from diminishing in length, said notches being so shaped that said extension unit may be expanded by pulling up on said auxiliary pedal, and means to release said lock unit.

7. An extension pedal unit adapted to be attached to a regular foot pedal comprising an auxiliary pedal having a toe and base section, a support platform including longitudinal tracks attached thereto, means to pivotally attach the base section of said auxiliary pedal to said tracks, means to lock said base section in selected position on said tracks with said auxiliary pedal in pivotal relation to said tracks, clip means attached to the underside of said toe section of said auxiliary pedal, an extension linkage unit connecting said auxiliary pedal in elevated relation to the regular foot pedal, means attached to and pivotable on the regular foot pedal which means is pivotally attached to said linkage unit, means pivotally attached to said clip means which means is pivotally attached to said linkage unit, and means attached to said linkage unit to permit the lengthening of said linkage unit and also prevent the reduction in length of said linkage unit.

References Cited in the file of this patent

UNITED STATES PATENTS

| | | |
|---|---|---|
| 1,248,592 | Anderson | Dec. 4, 1917 |
| 1,449,390 | Forse | Mar. 27, 1923 |
| 1,516,862 | Loury | Nov. 25, 1924 |
| 1,671,169 | Swain | May 29, 1928 |
| 1,708,820 | Wright | Apr. 9, 1929 |
| 1,733,854 | Bailey | Oct. 29, 1929 |

FOREIGN PATENTS

| | | |
|---|---|---|
| 265,233 | Italy | July 3, 1929 |